(12) United States Patent
Iisaka (10) Patent No.: US 7,121,669 B2
(45) Date of Patent: Oct. 17, 2006

(54) COLOR-FILTER ARRAY AND MANUFACTURING METHOD THEREFOR, DISPLAY DEVICE, AND PROJECTION DISPLAY DEVICE

(75) Inventor: Hidehito Iisaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 268 days.

(21) Appl. No.: 10/832,294

(22) Filed: Apr. 27, 2004

(65) Prior Publication Data

US 2004/0257541 A1 Dec. 23, 2004

(30) Foreign Application Priority Data

Jun. 17, 2003 (JP) .............................. 2003-172151

(51) Int. Cl.
*G03B 21/14* (2006.01)
*G03B 21/00* (2006.01)
*G02F 1/1335* (2006.01)

(52) U.S. Cl. ........................ 353/84; 353/31; 349/106; 349/108

(58) Field of Classification Search ................. 353/84, 353/30, 34, 37, 82, 31; 349/56, 77–79, 80, 349/97, 106–109; 430/502, 503, 511; 359/891
See application file for complete search history.

(56) References Cited

U.S. PATENT DOCUMENTS 5,040,875 A * 8/1991 Noguchi ..................... 349/143
5,737,040 A * 4/1998 Ichikawa et al. .............. 349/9

FOREIGN PATENT DOCUMENTS

| JP | A-03-135521 | 6/1991 |
| JP | A 9-325312 | 12/1997 |
| KR | 1990-10430 A | 7/1990 |

\* cited by examiner

*Primary Examiner*—W. B. Perkey
*Assistant Examiner*—Rochelle Blackman
(74) *Attorney, Agent, or Firm*—Oliff & Berridge, PLC (57) ABSTRACT

The invention provides a fine dichroic color-filter array. In particular, dichroic filter layers for B, R, and G, respectively, are patterned facing the corresponding blue pixel-electrodes, red pixel-electrodes, and green pixel-electrodes. The filter layers can be stacked on top of one another while being separated by transmissive interlayers.

9 Claims, 6 Drawing Sheets

COLOR-FILTER ARRAY AND MANUFACTURING METHOD THEREFOR, DISPLAY DEVICE, AND PROJECTION DISPLAY DEVICE

BACKGROUND OF THE INVENTION

1. Field of Invention

The present invention relates to dichroic filter and manufacturing methods therefor, and to direct-view display devices and projection display devices which include such color filters.

2. Description of Related Art

In color filters used in, for example, liquid crystal devices, absorbing filters which transmit light beams of a certain color and absorb beams of other colors, and reflective filters which transmit light beams of a certain color and reflect beams of other colors are known (for example, see Japanese Unexamined Patent Application Publication No. 9-325312). One of the known types of reflective filters is a dichroic filter which employs dielectric multilayer films.

In dichroic filters, the wavelength ranges for the transmitted light beams change depending on the layer structure of the dielectric multilayer film. By disposing three types of dichroic filters having transmitting wavelength ranges of, for example, R (red), G (green), and B (blue), respectively, color-filter arrays can be formed.

Dichroic filters exhibit (1) extremely high color purity; (2) no deterioration caused by, for example, light or heat since the filters are made of inorganic material; and (3) reusability of the reflected light by adjustment of the optical system.

SUMMARY OF THE INVENTION

In such dichroic filters, however, there are no significant differences between the film materials for different colors, such as red and green, and for this reason, etching selectivity in an actual patterning process cannot be ensured. Thus, conventionally, the only methods used for the patterning process are, for example, the lift-off method and the mask deposition method.

The use of the lift-off method or the mask deposition method, however, is difficult when forming patterns of several tens of microns in pitch. Accordingly, manufacturing is difficult for, for example, light valves used for projectors that require a pitch of 20 μm or less, or high-definition panels for, for example, cellular phones and PDAs.

It is an object of the invention to solve the problems mentioned above by providing a method for manufacturing a fine dichroic color-filter array, a color-filter array manufactured by this method, and a direct-view display device and a projection display device which include this color-filter array.

The reason why etching has not been used for the patterning process for dichroic filters is because sufficient etching selectivity cannot be ensured among different types of dichroic filters having various transmitting wavelength ranges, meaning that the patterning of a certain filter layer also causes other underlying, already-patterned filter layers to be etched. On the other hand, however, if it is possible to form each filter layer separately without harming the other underlying layers, a fine color-filter array can be manufactured using standard etching processes.

The invention conceives of stacking multiple types of filter layers while providing interlayers therebetween so as to solve such conventional manufacturing problems that are caused by multiple types of filters being arranged in the same layer.

A color-filter array according to the invention is provided with dichroic filter layers which are layered and are separated by transmissive interlayers, the filter layers transmitting light beams of different colors. The dichroic filter layers are each separated into layer segments, and the layer segments of the different filter layers are arranged such that the segments appear as if they are adjacent to one another in plan view.

For example, the color-filter array may be manufactured by the following method. Firstly, an dichroic filter layer is formed on a substrate by stacking a plurality of dielectric sub-layers each having a different refractive index from other sub-layers, the filter layer transmitting a light beam of a specific color while reflecting light beams of other colors (a filter-layer formation step). Secondly, the dichroic filter layer is patterned to form layer segments having a predetermined pattern (a patterning step). Thirdly, a transmissive interlayer is formed on the substrate so as to cover the dichroic filter layer (an interlayer formation step). Then, the filter-layer formation step, the patterning step, and the interlayer formation step are repeated in that order to stack the dichroic filter layers on the substrate, the filter layers transmitting light beams of different colors. In the patterning steps, the layer segments of the different filter layers are patterned such that the segments appear as if they are arranged adjacent to one another in plan view (in detail, the filter layer segments of different transmitting colors appear as if the segments are arranged in a matrix).

According to the invention, the dichroic filter layers of multiple types can be layered and are separated by interlayers. Thus, during the patterning of each filter layer, the underlying interlayer functions as an etching stopper or an etching buffer so as not to harm the underlying filter layer. This enables the use of dry-etching for the patterning step of each filter layer, and provides a fine color-filter array.

Furthermore, in the invention, because the different types of filter layers are stacked in the thickness direction, light-shielding regions (black matrix) can be readily made by partially overlapping the surfaces of the filter layers. The stacking of such dichroic filter layers that transmit different colors allows a color beam component to transmit through one filter layer while being reflected by other layers. As a result, the overlapping regions of two types of filter layers appear black. Accordingly, the light-shielding regions can be made without forming an additional layer so as to reduce the number of manufacturing steps as well as manufacturing costs.

Furthermore, after forming the interlayer in each interlayer formation step, it is preferable to planarize the surface of the interlayer by, for example, CMP (Chemical Mechanical Polishing) to improve the color purity of the light beams transmitted through each filter layer.

The color-filter array is applicable to a direct-view display device or a projection display device. In detail, a display device according to the invention can include a light source, a light modulator which modulates a light beam emitted from the light source, and the color-filter array which is disposed between the light source and the light modulator or adjacent to the light-emitting side of the light modulator. Alternatively, a projection display device according to the invention includes a light source, a light modulator which modulates a light beam emitted from the light source, a projecting device which projects the light beam modulated by the light modulator, and the color-filter array which is disposed between the light source and the light modulator or between the light modulator and the projection means. Accordingly, a high-definition direct-view display device and projection display device that utilize light efficiently are provided.

The number of types of the filter layers forming the color-filter array may be adjusted to three or four or more, depending on the number of primary colors used for the display. In detail, three types of filter layers for red, green, and blue colors, respectively, may be suitably used. In this case, to improve the returnability of green beams, which have high visibility (i.e. have the highest contribution ratio to the luminance), it is preferable to dispose the green-beam-transmitting filter layer farthest from the light source among the three filter layers that are disposed in order from the light source. In other words, since a light beam reflected by the filter layer disposed farthest from the light source returns to the light source through the two interlayers provided adjacent to the light source, some beam intensity is lost in the process of passing through these interlayers. For this reason, disposing of the two filter layers which reflect green beams closer to the light source minimizes the intensity loss of the green beams to achieve brighter illumination.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
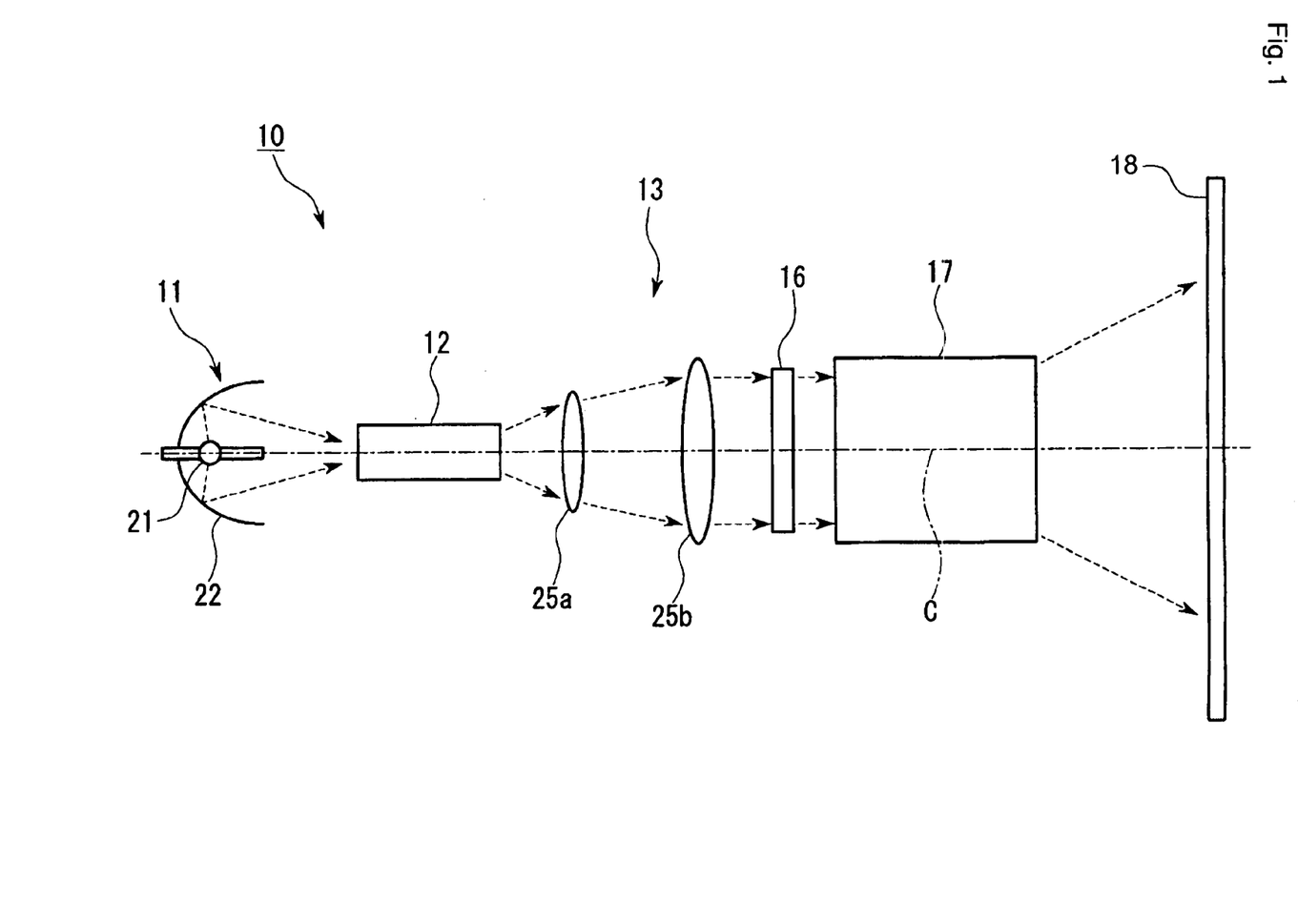
FIG. 1 is a schematic diagram of a projection display device according to an embodiment of the present invention.

A projection display device according to an embodiment of the invention will now be described with reference to FIGS. 1 to 6. A projection display device 10 of this embodiment is a single-panel color-projection liquid-crystal-display device which includes a liquid crystal element 16 having a color-filter array and functioning as a light valve. FIG. 1 is a schematic diagram of the projection display device 10 which includes a light source 11, an integrator rod 12, a condenser lens 13, the liquid crystal element 16, and a projection lens 17.

Referring to FIG. 1, according to the projection display device 10 of this embodiment, the light source 11 emits a white light beam, the integrator rod 12 then uniformly distributes the luminance of the white light beam emitted from the light source 11, the condenser lens 13 collimates the luminance-distributed white light beam, the liquid crystal element 16 separates the collimated white light beam into RGB beam components and modulates each separated beam component, and the projection lens 17 projects each modulated beam component onto a screen 18.

As shown in FIG. 1, the light source 11 can be provided with a lamp 21, such as a metal halide lamp, for emitting white light beams, and a reflector 22 that reflects the emitted white light beams.

For the integrator rod 12, a transmissive light-guiding rod (such as a glass rod) or a light-guiding tube having a reflective inner surface may be used.

The condenser lens 13 is provided with a condenser lens component 25a and a condenser lens component 25b which collimate the beam emitted from the integrator rod 12 before the beam enters the liquid crystal element 16.

Figure 2:
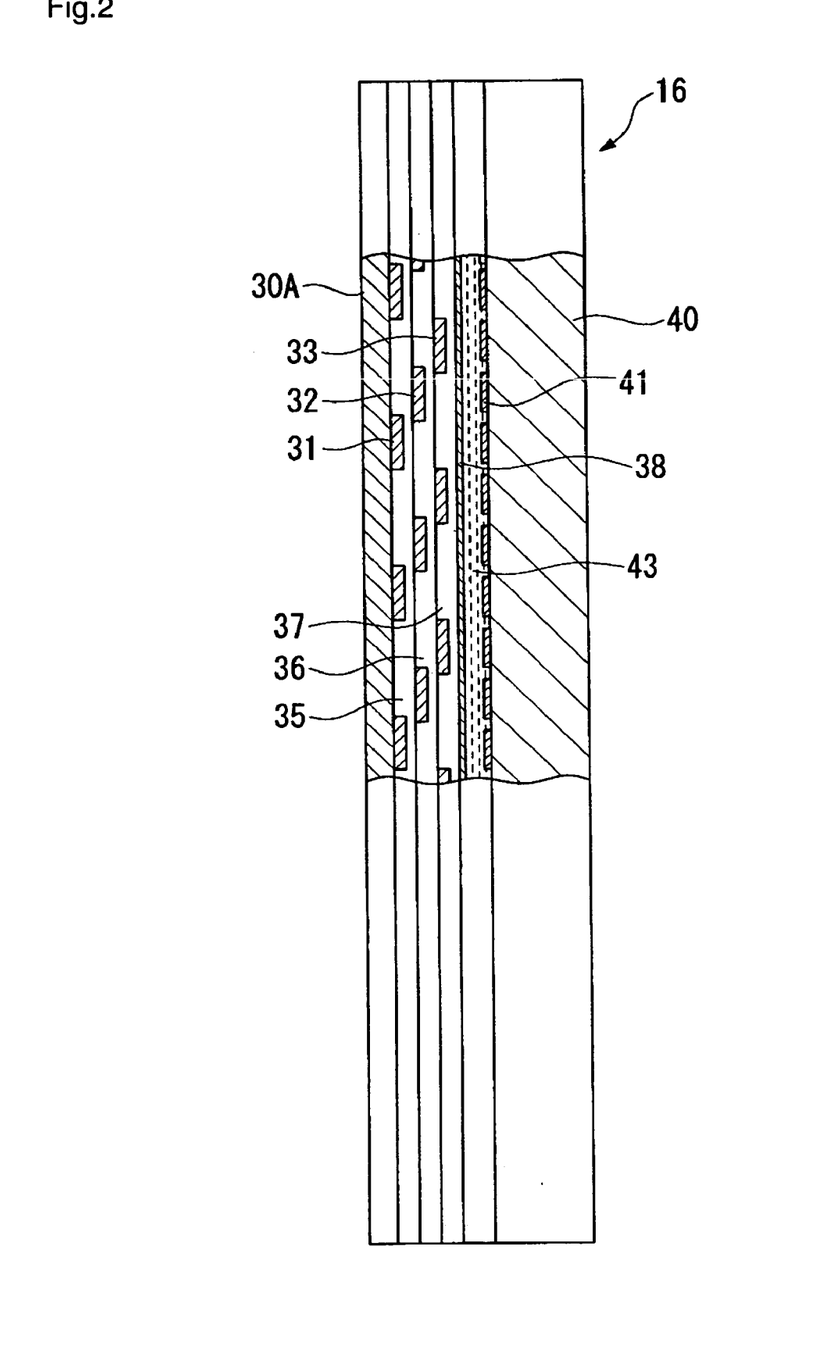
FIG. 2 is a schematic diagram of a color-filter array and a liquid crystal element provided in the projection display device according to the embodiment of the present invention.
Figure 3:
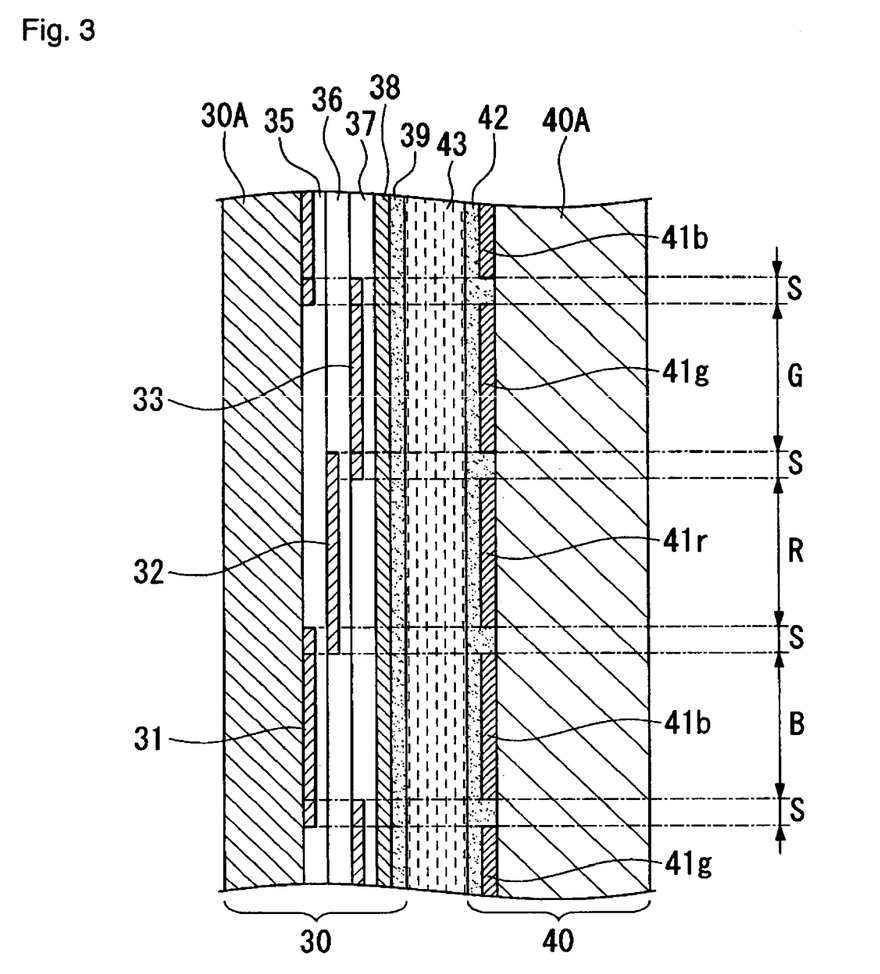
FIG. 3 is an enlarged cross-sectional view of the color-filter array and the liquid crystal element according to the embodiment of the present invention.

FIG. 2 is a schematic diagram of the liquid crystal element 16 according to this embodiment. FIG. 3 is an enlarged cross-sectional view showing the relevant parts of the liquid crystal element 16.

The liquid crystal element 16 of this embodiment can include a TFT-array substrate 40, an opposing substrate 30, and a liquid crystal layer 43, which is disposed between the substrates 30 and 40 and which functions as a light modulation layer.

As shown in FIG. 3, the TFT-array substrate 40 can include a substrate body 40A composed of, for example, glass or quartz, on which transmissive pixel electrodes 41 formed of, for example, ITO are arranged in a matrix. On the substrate body 40A, blue pixel-electrodes 41b, red pixel-electrodes 41r, and green pixel-electrodes 41g are arranged for blue, red, and green display, respectively. A set of three pixel electrodes 41b, 41r, and 41g form one pixel. The pixel electrodes 41 (41b, 41r, and 41g) are covered by an alignment film 42 composed of, for example, polyimide. Components for controlling the electricity distribution for the pixel electrodes 41, such as switches, scanning lines, and signal lines, are omitted in FIGS. 2 and 3.

The opposing substrate 30 can function as a color-filter array substrate and includes a substrate body 30A composed of a transmissive plate of, for example, glass or plastic. On the substrate body 30A, multiple filter layers 31, 32, and 33 (for example, three types of filter layers in this embodiment) are provided, the filter layers transmitting light beams of different colors.

Each of the filter layers 31 to 33 is a dichroic filter layer formed of a dielectric multilayer film. For instance, the filter layer 31 is a blue filter layer that transmits only blue beam components (B) and reflects any other beam components of different colors, the filter layer 32 is a red filter layer that transmits only red beam components (R) and reflects any other beam components of different colors; and the filter layer 33 is a green filter layer that transmits only green beam components (G) and reflects any other beam components of different colors.

A dielectric multilayer film of this type that reflects a beam component of a certain wavelength range is fabricated using high refractive-index dielectric material and low refractive-index dielectric material. The high refractive-index dielectric material and the low refractive-index dielectric material are alternately layered on top of one another by, for example, deposition. In this case, the thickness of the film is adjusted by forming several sub-layers to several tens of sub-layers such that the optical thickness, which is determined by the refractive index and the film thickness, is a quarter wavelength at the central wavelength in the target wavelength range. Alternatively, known techniques for, for example, preventing ripples in the transmittance-reflectance characteristics may be used in combination with the dielectric multilayer film. For example, between the sub-layers, an anti-reflection layer, a spacer layer such as a half-wave layer, and an adjustment layer may be provided. For the high refractive-index dielectric material, ZnS and $TiO_2$, for example, are commonly used, whereas, for the low refractive-index dielectric material, $MgF_2$, $SiO_2$, and $Na_3AlF_6$, for example, are commonly used. Furthermore, the target wavelength may be shifted by adjusting the thickness of the dielectric film, and therefore, the dielectric material does not necessarily need to be changed.

According to this embodiment, the dichroic filter layers 31 to 33 have interlayers therebetween and are disposed on the substrate 30. In detail, the blue filter layer 31 is first patterned on the substrate 30, and then a first transmissive interlayer 35 is disposed over the filter layer 31. Then, the red filter layer 32 is patterned on the first interlayer 35, and a second transmissive interlayer 36 is disposed over the filter layer 32. Moreover, the green filter layer 33 is patterned on the second interlayer 36, and a third transmissive interlayer 37 is disposed over the filter layer 33.

These filter layers 31, 32, and 33 correspond to the respective blue pixel-electrode 41b, red pixel-electrode 41r, and green pixel-electrode 41g of the TFT-array substrate 40. The filter layers 31 to 33 are patterned into segments so that, in plan view, the segments appear as if they are arranged adjacent to one another in a matrix-like manner.

A transmissive common electrode 38 composed of, for example, ITO is disposed above the substrate body 30A to cover the entire surface of the interlayer 37, and an alignment film 39 composed of, for example, polyimide is disposed over the common electrode 38.

Figure 4:
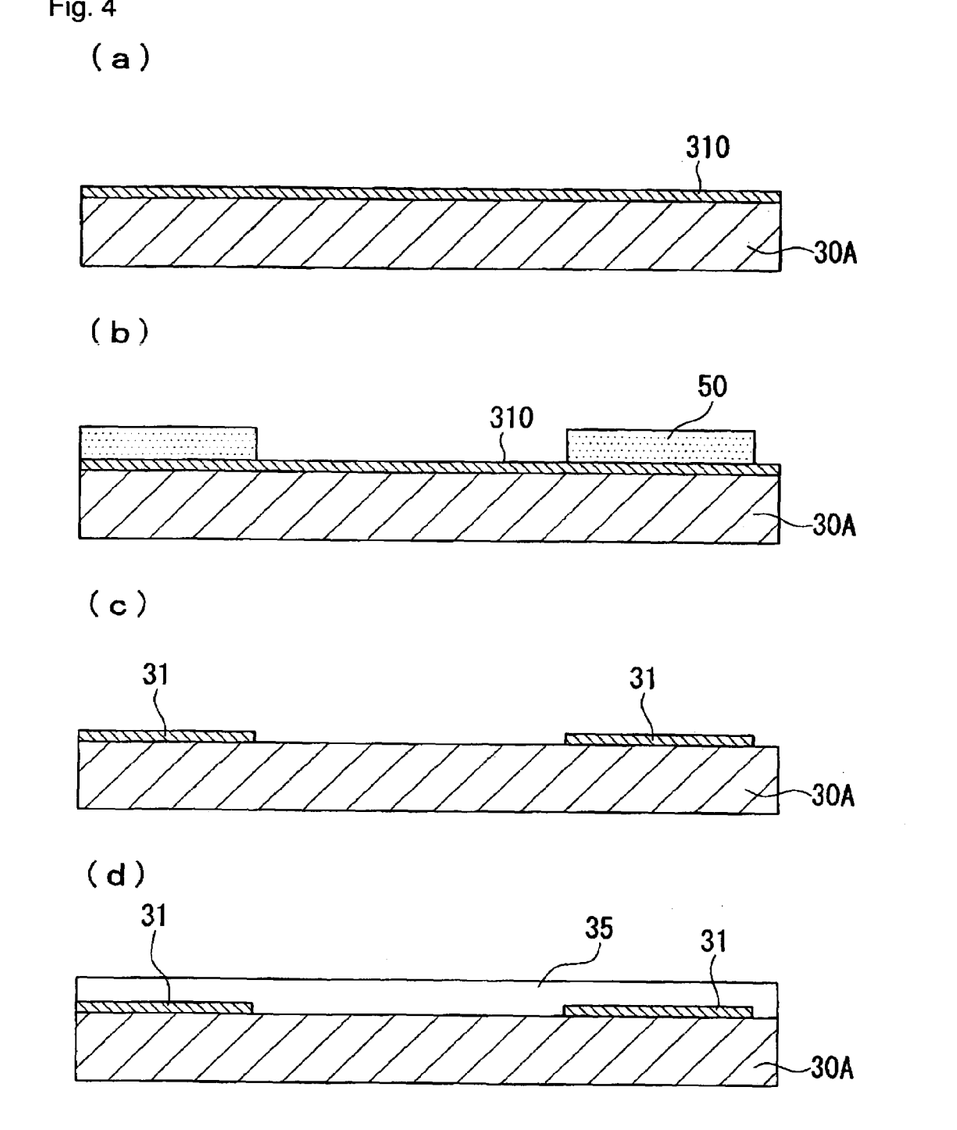
FIG. 4 includes process drawings describing the steps for manufacturing the color-filter array according to the embodiment of the present invention.

The substrate 30 is fabricated by the following method. Referring to FIG. 4(a), 15 to 25 dielectric sub-layers having different refractive indices are coated over the transmissive substrate body 30A formed of, for example, glass to form a preliminary blue filter layer 310 which transmits blue beams (filter-layer formation step).

Referring to FIG. 4(b) and FIG. 4(c), resist layer segments 50 are first formed on the preliminary filter layer 310, and the preliminary filter layer 310 is then patterned to a predetermined pattern by dry-etching (patterning step). FIG. 4(c) illustrates segments of the blue filter layer 31 formed by the patterning step. In this patterning step, each segment of the blue filter layer 31 is disposed such that the segment faces the corresponding blue pixel-electrode 41b of the TFT-array substrate 40. Furthermore, each segment of the filter layer 31 has a size that covers the corresponding blue pixel-electrode 41b and its peripheral non-pixel region S.

Referring to FIG. 4(d), the first transmissive interlayer 35 composed of, for example, $SiO_2$ is then formed over the substrate body 30A to cover the filter layer 31 (interlayer formation step).

The interlayer 35 functions as an etching stopper or an etching buffer in the patterning step of a red filter layer, which will be described later. To achieve this, the thickness of the interlayer 35 is adjusted to an extent such that a sufficient etching margin for the patterning of the red filter layer is ensured. Where necessary, the surface of the interlayer 35 may then be planarized by, for example, CMP (Chemical Mechanical Polishing). Accordingly, the planarization of the interlayer 35 may improve the color purity of the beams transmitted through the filter layer 31.

Figure 5:
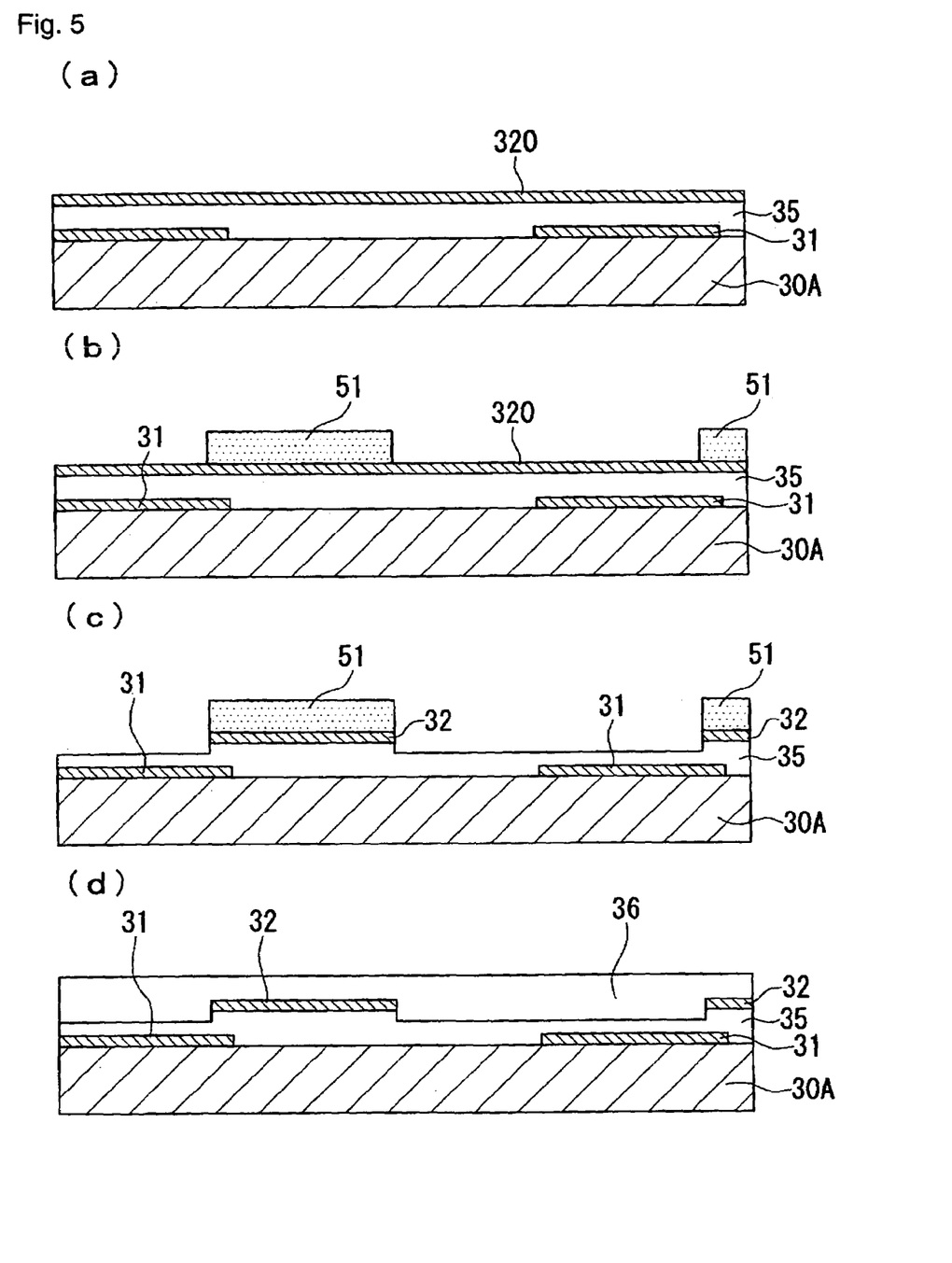
FIG. 5 includes process drawings of steps continuing from FIG. 4.

Referring to FIG. 5(a), the same dielectric material used for the blue filter layer 31 can be deposited over the interlayer 35 to form 15 to 25 sub-layers having different thicknesses. Thus, a preliminary red filter layer 320 which transmits red beams is formed. Resist layer segments 51 are then disposed on the preliminary filter layer 320 (FIG. 5(b)), and the preliminary filter layer 320 is patterned to a predetermined pattern by dry-etching (FIG. 5(c)). The conditions for this etching process are the same as those for the blue-filter-layer patterning step. FIG. 5(c) illustrates segments of the red filter layer 32 formed by the patterning step. In this patterning step, each segment of the red filter layer 32 is disposed such that the segment faces the corresponding red pixel-electrode 41r of the TFT-array substrate 40. Furthermore, each segment of the filter layer 32 has a size that covers the corresponding red pixel-electrode 41r and its peripheral non-pixel region S.

In this patterning step of the preliminary red filter layer 320, the first interlayer 35 functions as an etching stopper or an etching buffer, and therefore, the underlying blue filter layer 31 is not affected by this patterning step.

Referring to FIG. 5(d), a second transmissive interlayer 36 composed of, for example, $SiO_2$ is then formed above the substrate body 30A to cover the filter layer 32. The interlayer 36 functions as an etching stopper or an etching buffer for the patterning step of a green filter layer, which will be described later. To achieve this, the thickness of the interlayer 36 is adjusted to an extent such that a sufficient etching margin for the patterning of the green filter layer is ensured. Where necessary, the surface of interlayer 36 may be planarized by, for example, CMP.

Figure 6:
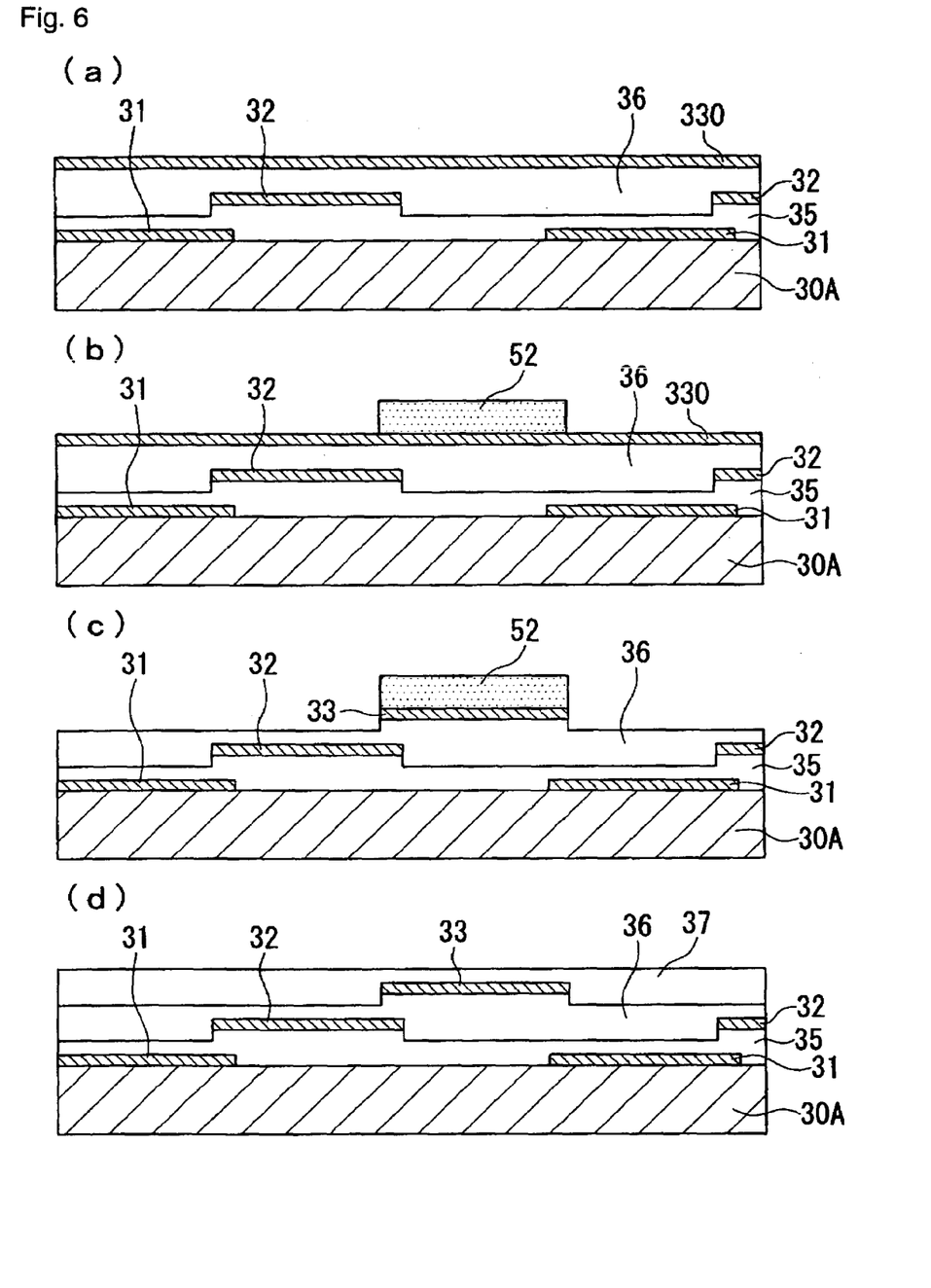
FIG. 6 includes process drawings of steps continuing from FIG. 5.

Referring to FIG. 6(a), the same dielectric material used for the blue filter layer 31 and the red filter layer 32 can be deposited over the interlayer 36 to form 27 to 40 sub-layers having different thicknesses. Thus, a preliminary green filter layer 330 which transmits green beams is formed. Resist layer segments 52 are then disposed on the preliminary filter layer 330 (FIG. 6(b)), and the preliminary filter layer 330 is patterned to a predetermined pattern by dry-etching (FIG. 6(c)). The conditions for this etching process are the same as those for the blue-filter-layer and red-filter-layer patterning steps. FIG. 6(c) illustrates segments of the green filter layer 33 formed by the patterning step. In this patterning step, each segment of the green filter layer 33 is disposed such that the segment faces the corresponding green pixel electrode 41g of the TFT-array substrate 40. Furthermore, each segment of the filter layer 33 has a size that covers the corresponding green pixel electrode 41g and its peripheral non-pixel region S.

In this patterning step of the preliminary green filter layer 330, the second interlayer 36 functions as an etching stopper or an etching buffer, and therefore, the underlying red filter layer 32 is not affected by this patterning step.

Referring to FIG. 6(d), a third transmissive interlayer 37 composed of, for example, $SiO_2$ is then formed above the substrate body 30A to cover the filter layer 33. Where necessary, the surface of the interlayer 37 may be planarized by, for example, CMP. The transmissive common electrode 38 formed of, for example, ITO is then coated over the interlayer 37 to cover the entire surface of the substrate body 30A, and the alignment film 39 composed of, for example, polyimide is disposed over the common electrode 38. Here, the interlayer 37 is provided for ensuring adhesiveness and reliability of the common electrode 38 and it is not essential. It is also possible to form the common electrode 38 before forming the interlayer 37. In this case, the interlayer 37 functions as a protective film for the common electrode 38.

The substrates 30 and 40 are held at a predetermined distance from each other by a spacer (not shown in the drawings), and are joined together by applying a sealant (not shown in the drawings) along the edges of the substrates 30 and 40 in a frame-like manner. Liquid crystal fills the space hermetically sealed by the substrates 30 and 40 and the sealant to form the liquid crystal layer (light modulating layer) 43.

According to this embodiment, the dichroic filter layers are layered and are separated by interlayers. Thus, during the patterning of each filter layer, the underlying interlayer functions as an etching stopper or an etching buffer so as not to harm the underlying filter layer. This enables the use of dry-etching for the patterning step of each filter layer, and achieves, for example, fine patterning of a pixel pitch of 20 µm or less for the light valve.

Alternatively, because the filter layers 31 to 33 are stacked in the thickness direction of the opposing substrate 30 in this embodiment, light-shielding regions (black matrix) can be readily made by partially overlapping the surfaces of the filter layers 31 to 33. For example, in this embodiment, since each segment of the filter layers 31 to 33 has a size that covers the corresponding pixel electrode 41 and its peripheral non-pixel region S in plan view, adjacent segments of the filter layers 31 to 33 (the adjacent segments of the filter layers 31 and 32, the filter layers 32 and 33, and the filter layers 33 and 31) in plan view are arranged in a state such that the regions of the adjacent segments corresponding to the non-pixel regions S overlap with one another. The stacking of such filter layers that transmit different colors allows a color beam component to transmit through one filter layer while being reflected by other layers. As a result, the overlapping regions of two types of filter layers (non-pixel regions S) appear black. According to this embodiment, the light-shielding regions can be made without forming an additional layer so as to reduce the number of manufacturing steps as well as manufacturing costs.

Furthermore, in this embodiment, because the filter layer 33 that transmits green beams is positioned the farthest from the light source 11 among the three filter layers 31 to 33, the returnability of the green beams, which have high visibility (i.e. have the highest contribution ratio to the luminance), is improved to reduce the intensity loss of the green beams. In other words, since a beam component reflected by the filter layer disposed farthest from the light source returns to the light source through the two interlayers provided adjacent to the light source, some beam intensity is lost in the process of passing through these interlayers. For this reason, disposing of the two filter layers which reflect green beams closer to the light source minimizes the intensity loss of the green beams to achieve brighter illumination.

It should be understood that the technical scope of the invention is not limited to the above embodiment, and modifications are permissible within the scope and spirit of the present invention.

For example, although three types of filter layers are provided in the above embodiment, four or more types are also permissible depending on the number of primary colors used for the display. In that case, one pixel correspondingly has four or more pixel electrodes.

The above embodiment describes an example of the projection display device employing the transmissive liquid crystal element as a light modulator. However, the technical scope of the invention is not limited to such transmissive types, and the color-filter array of the present invention may alternatively be applied to, for example, a reflective projection display device such as an LCOS device, or a projection display device employing a mirror-type spatial light modulator based on MEMS technology.

Furthermore, although the above embodiment describes an example of the color-filter array of the invention being applied to the light valve (liquid crystal element) of the projection display device, the color-filter array is not only applicable to projection display devices but also to direct-view display devices.

What is claimed is:

1. A color-filter array, comprising:
   dichroic filter layers which are layered and are separated by transmissive interlayers, the filter layers transmitting light beams of different colors, further, the dichroic filter layers are each separated into layer segments, the layer segments of the different filter layers being arranged such that the segments appear as if they are adjacent to one another in plan view; each dichroic filter layer being formed of a dielectric multilayer film.

2. The color-filter array according to claim 1, at least one edge of each layer segment of one dichroic filter layer overlapping with at least one edge of adjacent segments of other filter layers.

3. A method for manufacturing a color-filter array, comprising:
   forming a dichroic filter layer on a substrate by stacking a plurality of dielectric sub-layers each having a different refractive index from other sub-layers, the filter layer transmitting a light beam of a specific color while reflecting light beams of other colors;
   patterning the dichroic filter layer to form layer segments having a predetermined pattern; and
   forming a transmissive interlayer on the substrate so as to cover the dichroic filter layer,
   the forming dichroic filter layer, patterning dichroic filter layer, and forming transmissive interlayer steps being repeated in that order to stack the dichroic filter layers on the substrate, the filter layers transmitting light beams of different colors, the patterned layer segments of the different filter layers being arranged such that the segments appear as if they are adjacent to one another in plan view.

4. The method for manufacturing a color-filter array according to claim 3, each interlayer formation step including a sub-step for planarizing the surface of the interlayer.

5. The method for manufacturing a color-filter array according to claim 3, edges of each layer segment of one of the dichroic filter layers overlapping with edges of adjacent segments of the other filter layers.

6. A display device, comprising:
   a light source;
   a light modulator which modulates a light beam emitted from the light source; and
   the color-filter array according to claim 1, which is disposed between the light source and the light modulator or adjacent to the light-emitting side of the light modulator.

7. The display device according to claim 6, further comprising dichroic filter layers which include a red filter layer that transmits red beams, a green filter layer that transmits green beams, and a blue filter layer that transmits blue beams,
   wherein, among the three filter layers, the green filter layer is disposed farthest from the light source.

8. A projection display device, comprising:
a light source;
a light modulator which modulates a light beam emitted from the light source;
a projection device that projects the light beam modulated by the light modulator; and
the color-filter array according to claim 1, which is disposed between the light source and the light modulator or between the light modulator and the projection device.

9. The projection display device according to claim 8, further comprising, dichroic filter layers which include a red filter layer that transmits red beams, a green filter layer that transmits green beams, and a blue filter layer that transmits blue beams, wherein, among the three filter layers, the green filter layer is disposed the farthest from the light source.

* * * * *